US007038981B1

(12) United States Patent
Mau

(10) Patent No.: US 7,038,981 B1
(45) Date of Patent: May 2, 2006

(54) METHODS FOR ESTABLISHING AUDIO TRACK DIGITAL AUDIO EXTRACTION SPEED

(75) Inventor: Yau-Ting Mau, Fremont, CA (US)

(73) Assignee: Sonic Solutions, Inc., Santa Clara, CA (US)

(*) Notice: Subject to any disclaimer, the term of this patent is extended or adjusted under 35 U.S.C. 154(b) by 613 days.

(21) Appl. No.: 10/184,683

(22) Filed: Jun. 26, 2002

(51) Int. Cl.
G11B 7/00 (2006.01)
G11B 5/09 (2006.01)

(52) U.S. Cl. ............... 369/47.39; 369/53.3; 369/47.12
(58) Field of Classification Search .................... None
See application file for complete search history.

(56) References Cited

U.S. PATENT DOCUMENTS 5,414,688 A * 5/1995 Inokuchi ................. 369/47.12
6,388,965 B1 * 5/2002 Ozawa et al. ............ 369/47.12
6,529,452 B1 * 3/2003 Tabuchi et al. .......... 369/47.12
6,785,208 B1 * 8/2004 Fujimoto et al. ........ 369/53.18

* cited by examiner

Primary Examiner—Brian E. Miller
Assistant Examiner—Peter Vincent Agustin
(74) Attorney, Agent, or Firm—Martine Penilla & Gencarella, LLP

(57) ABSTRACT

Methods for determining recording speeds to optical media are provided. In one example, a method includes an algorithm in which a digital audio extraction (DAX) speed is determined for a first part of an audio track is measured, a DAX speed for an end part of an audio track is measured, and the DAX speeds are compared. The slower of the two speeds is selected as the DAX speed for the audio track. Subsequent audio tracks are sampled by first measuring the DAX speed for an end part of the audio track. If the DAX speed for the end part of the audio track is faster than the DAX speed for the end part of the previous audio track, the first part of the audio track is sampled, and the slower DAX speed of the first and end parts of the audio track is selected as the DAX speed for the audio track.

6 Claims, 13 Drawing Sheets

METHODS FOR ESTABLISHING AUDIO TRACK DIGITAL AUDIO EXTRACTION SPEED

BACKGROUND OF THE INVENTION

1. Field of the Invention

The present invention relates generally to the recording of audio data onto optical media, and more particularly to a method for determining digital audio extraction (DAX) speeds in preparation for commencing a recording operation to prevent buffer underruns.

2. Description of the Related Art

When recording audio data to optical media, the source audio data is typically in a digital audio file format that must be extracted or decoded from a source location during the recording process. Selected audio data is typically retrieved by a recording engine of the host computer system. The recording engine reads data from the source which can be, for example, the host system hard disk drive, a peripheral optical media device connected to the host system, a source on the Internet, a local network, another optical media drive on a network, and the like. The audio data is extracted and transferred to a faster access buffer memory, or to system cache before transfer to faster access buffer memory, and then continuously recorded onto one or more tracks of an optical media during a recording session.

In preparation for recording, also known as "burning" or "ripping," a number of calculations and preparatory actions, also known as pre-burn calculations, are performed. Such actions include, but are not limited to, mapping each of the source audio files, mapping a destination or target location for each of the audio files to be recorded to the destination or target optical media, determining a size of each selected audio file, determining which audio files will be sent to system cache and which will be read directly into the recording device buffer memory, and various other determinations, computations, and other system and program functions completed in preparation for burning an audio optical media. As is well known, the results from several of the preparatory computations and actions are used to either set up a recording process that will avoid buffer underrun, or make a determination whether the selected audio files can be recorded to the identified target optical media without encountering buffer underrun.

As is known, buffer underrun occurs when the rate of recording onto the optical media exceeds the rate at which the recording engine can replenish data in the buffer memory. As recording rates for optical media have increased beyond 4× (1× being defined as normal music playback speed), the capability of the recording device to burn audio to optical media often exceeds the capability of the recording engine to transfer audio data to buffer memory. Eventually, after a buffer underrun occurs, the burning stops. With the technological advancements being realized in optical media recording devices, recording speeds continue to increase. This leads to increased likelihood of buffer underrun, and inefficient use of recording resources.

The consequences of one or more buffer underruns during recording to an optical media depend on the type of optical media used during the recording. By way of example, a CD-R optical disc can be recorded to only one time. Any data recorded prior to buffer underrun are inaccessible and typically cause the CD-R optical disc to be scrapped and replaced by a fresh CD-R optical disc for a repeated recording. In another example, a CD-RW optical disc can be written to multiple times, since the optical disc can be erased and the recording can be repeated. However, the repeating of recording sessions can take considerable time. Furthermore, regardless of whether the optical media is CD-R or CD-RW, high speed CD-RW, ultra-high speed CD-RW, or any other type of optical media as desired, another buffer underrun can occur during the repeated recording session, causing the loss of the time spent on the recording session, if not loss of the entire optical media.

The recording engine typically compensates in situations of slower data transfer to buffer memory by slowing the recording speed of the recording device so that the recording device is not depleting the buffer faster than the recording engine can replenish it. As described above, a factor in the determination of the speed of data transfer is the DAX speed of the source media drive. In general, the higher the DAX speed for a source media, the higher the record speed can be set to the target optical media while continuing to minimize the risk of buffer underrun.

The prior art method to determine an optimum recording speed to match the rate of depletion of data from the buffer with the rate of replenishment typically includes determination of the DAX speed for the audio source device. As is known, optical media devices are rated at a specific read speed and, if applicable, a specific write speed. Typically, the rated read speed is the maximum read speed of the device The actual DAX speed for a particular source media can vary depending on, by way of example, the type of media in the source device (e.g., CD-R, CD-RW, high speed CD-RW, ultra-high speed CD-RW, and the like).

In order to determine the actual DAX speed for a particular device having a particular media mounted thereon, prior art methods include the measurement of the DAX speed from the first audio track of the source media. Typically, a single measurement of the source DAX speed is taken, and then used for the entire recording process. FIG. 1 shows a typical optical media 106. Audio data that is recorded to the optical media 106 is commonly recorded in successive tracks with each track having a single audio file or song. The first track or song, i.e., Track 1, is typically recorded beginning with the innermost or center region 110 of the optical media 106, with successive tracks recorded in a circular or spiral pattern progressing towards the outer region 112 of the optical media 106. In FIG. 1, therefore, the region on the optical media 106 identified by 110 might contain data in a first recorded track, i.e., Track 1, and the region identified by 112 might contain data in a later-recorded track, e.g., Track n.

When most optical media devices extract digital audio data from an optical media 106, and specifically from an optical disc 106, the DAX speed is slower in the inner regions of an optical disc 106 than the DAX speed in the outer regions of an optical disc 106. In FIG. 1, the DAX speed in region 110 is slower than the DAX speed in region 112. In the typical prior art method of measuring the DAX speed to make pre-burn calculations to set the record speed, the slowest DAX speed from the source media (i.e., the DAX speed measured from Track 1) is used for the entire recording process.

In view of the foregoing, there is a need for a method for measuring the DAX speed from a source to configure the recording of audio data to optical media for efficient use of system resources while minimizing risk of buffer underrun.

SUMMARY OF THE INVENTION

Broadly speaking, the present invention fills these needs by providing methods by which a rate at which digital audio data is extracted from a source is measured in order to more accurately and efficiently determine and set a recording speed for recording audio tracks to optical media. The present invention can be implemented in numerous ways, including as a process, an apparatus, a system, a device, a method, or a computer readable media. Several embodiments of the present invention are described below.

In one embodiment, a method for recording audio data to optical media, is disclosed. The method includes obtaining a number of audio tracks on a source optical media and setting a source optical media device to a maximum read speed for the source optical media device. The method further includes reading a first audio track on the source optical media and then determining a digital audio extraction (DAX) speed for the first audio track. The method next includes reading a mid-point audio track on the source optical media and determining the DAX speed for the mid-point audio track on the source optical media. The record speed for the number of audio tracks on the source optical media to a destination optical media is calculated using the DAX speed for the first audio track for recording the first audio track through an audio track immediately preceding the mid-point audio track, and the DAX speed for the mid-point audio track on the source optical media for recording the mid-point audio track through a last audio track.

In another embodiment, a method for determining a record speed for recording audio data to an optical media is disclosed. The method includes obtaining a number of audio tracks on a source optical media to be recorded to a destination optical media, and setting a source optical media device to the maximum read speed. A first audio track on the source optical media is read and a DAX speed for the first audio track is calculated. The method then continues with reading a next audio track on the source optical media and determining the DAX speed for a next audio track on the source optical media. The reading of an audio track and the determining of the DAX speed is repeated for each audio track on the source optical media. A record speed is calculated for each audio track on the source optical media to be recorded to the destination optical media using the determined DAX speed for each respective audio track on the source optical media.

In still a further embodiment, a method for determining a record speed for recording audio data from a source optical media to a destination optical media is disclosed. The method includes determining a maximum read speed for a source optical media device, and setting the source optical media device to the maximum read speed. A first part of a first audio track on the source optical media is read, and the DAX speed for the first part of the first audio track is determined. An end part of the first audio track on the source optical media is then read and the DAX speed for the end part of the first audio track is determined. The slower of the DAX speed for the first part of the first audio track and the DAX speed for the end part of the first audio track is selected. Next, the method provides for reading an end part of a next audio track on the source optical media and determining the DAX speed for the end part of the next audio track. The DAX speed for the end part of the next audio track is then compared with the DAX speed for the end part of the first audio track. The method includes selecting the DAX speed for the end part of the next audio track when the DAX speed for the end part of the next audio track is less than or equal to the DAX speed for the end part of the first audio track. The reading of the end part of the next audio track, the determining of the DAX speed for the end part of the next audio track, and the comparing of the DAX speed for the end part of the next audio track with the DAX speed of an end part of an immediately preceding audio track is repeated for each audio track on the source optical media. The method further repeats the selecting of the DAX speed for the end part of the next audio track when the DAX speed for the end part of the next audio track is less than or equal to the DAX speed for the end part of the immediately preceding audio track for each audio track on the source optical media. A recording speed for the audio tracks to the destination optical media is determined using the selected DAX speeds.

The advantages of the present invention are numerous. One notable benefit and advantage of the invention is that embodiments of the present invention provide for accommodating the changing digital audio extraction (DAX) speeds from a center region of an optical media disc to an outer region of the optical media disc. By measuring the actual DAX for audio tracks from different locations on an optical media disc, recording resources can be more efficiently utilized with increased recording speed for audio tracks having higher DAX rates.

Another benefit is that buffer under-run can be minimized or avoided in the recording of audio to CD or other optical media. As described above, the increasing speed capabilities of recording devices does not take into account the rate at which the CD recording engine can supply data to a buffer for the CD recording device. The present invention provides a plurality of methods by which the CD recording engine can determine a DAX for specific source audio tracks, and then use that rate to set the recording speed for the selected recording device. By matching the recording speed of the optical media recording device to the rate at which audio data is extracted and then supplied to the buffer for the CD recording device, buffer under-run is avoided.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

Methods for measuring digital audio extraction (DAX) speeds for recording audio data to optical media are disclosed. In preferred embodiments, the methods include measuring the DAX speed at different locations on a source optical media, and then using the measured DAX speed to set and adjust the record speed in order to more efficiently use available recording resources, minimize buffer underrun, and minimize actual recording speed.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 2A:
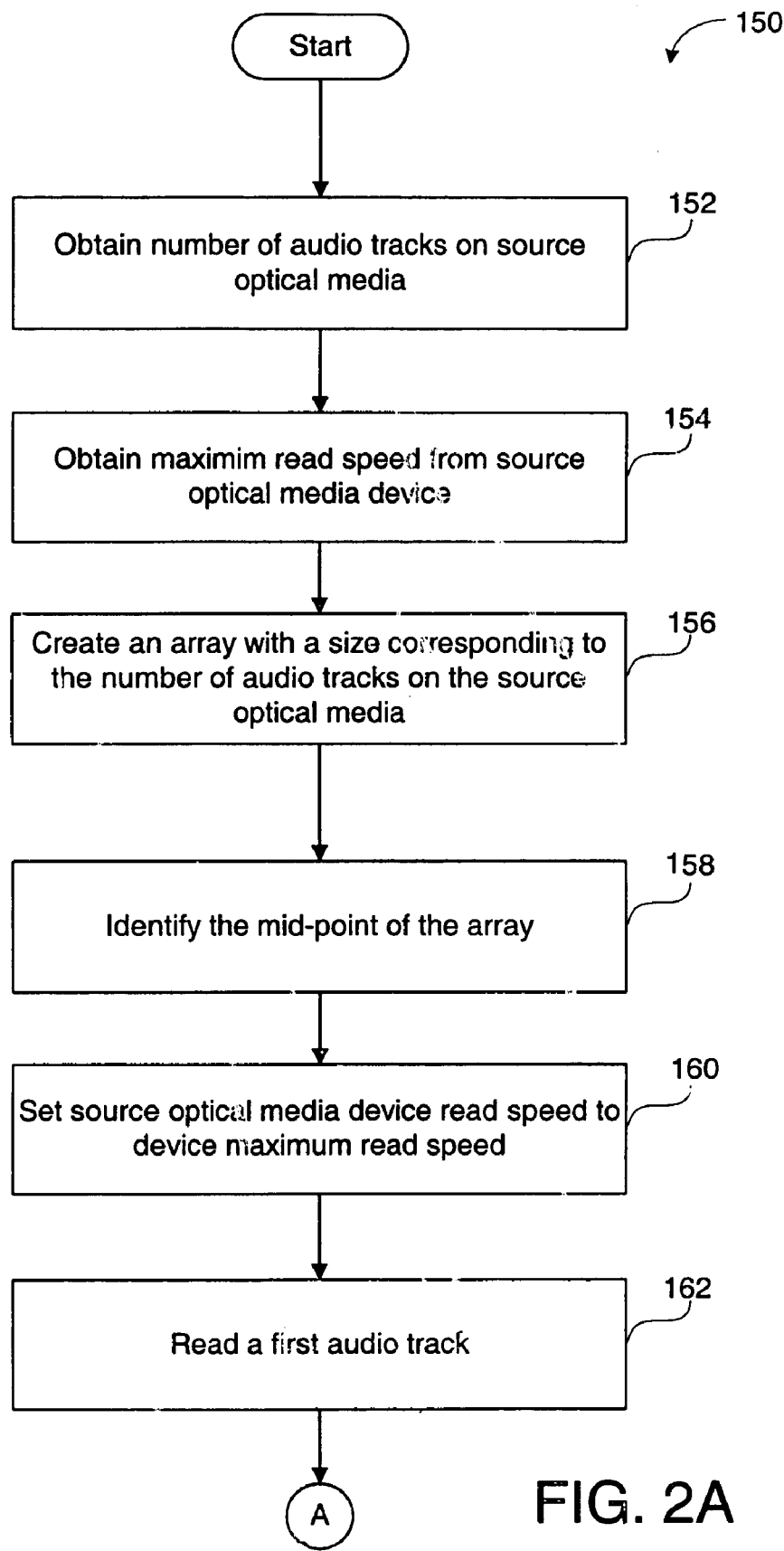
FIG. 2A shows a first part of a flowchart diagram illustrating the method operations performed to measure a DAX speed in preparation for recording audio data to an optical media in accordance with one embodiment of the present invention.
Figure 2B:
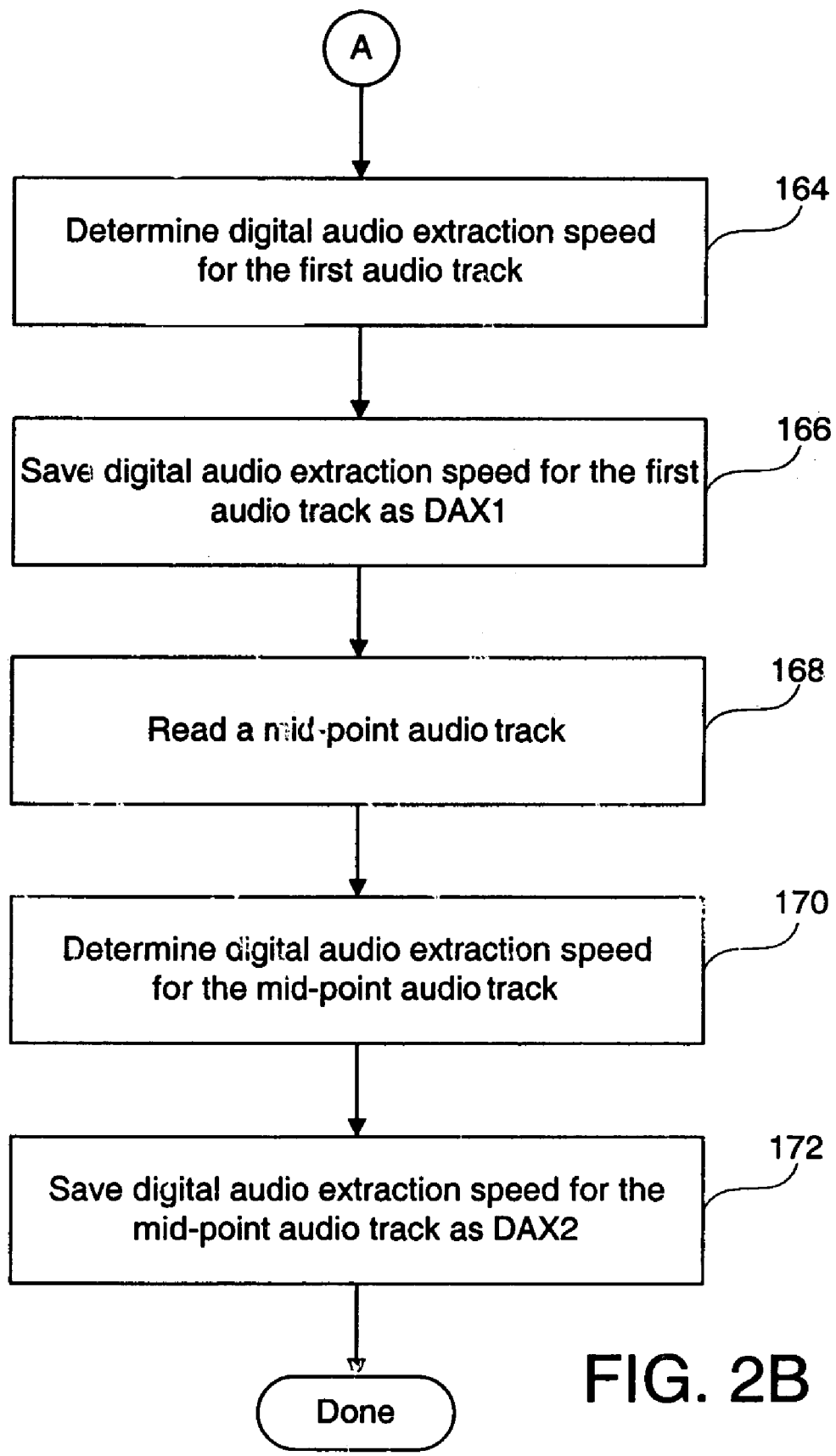
FIG. 2B shows the conclusion of a flowchart diagram illustrating the method operations performed to measure a DAX speed in preparation for recording audio data to an optical media in accordance with one embodiment of the present invention.

FIGS. 2A and 2B depict a flowchart diagram 150 illustrating the method operations performed to measure a DAX speed in preparation for recording audio data to an optical media in accordance with one embodiment of the present invention. FIG. 2A shows a first part of the flowchart diagram 150, and FIG. 2B shows the conclusion of flowchart diagram 150.

As an overview, embodiments of the present invention provide algorithms used in one of a plurality of pre-burn calculations used in preparation for recording audio data to optical media. The typical consumer, using an optical media recording application, selects one or more audio files from a source or from a plurality of sources for recording to an optical media. The target or destination optical media might be a CD-R, a CD-RW, a high speed CD-RW, ultra-high speed CD-RW, and the like. Once the typical consumer selects the audio files from the source (or from multiple sources), "burn" or "record" is selected, and the optical media recording application, along with a recording engine on the host system, perform a plurality of calculations, computations, file mapping, file ordering, and other such preparatory actions in order to record the selected files to a target optical media in a single, continuous process or session. Embodiments of the present invention are implemented to maximize the efficient use of recording system resources such as the write (recording) speed of the optical media recording device while minimizing the likelihood of buffer underrun.

As shown in FIG. 2A, the method of one embodiment of the invention begins with operation 152 in which the number of audio tracks on a source optical media is obtained. In one embodiment, a table of contents (TOC) 122 (see FIGS. 3A, 3B) of the source media is read to obtain the total number of audio tracks to be read from a source media and recorded to a destination optical media. As is known, a session on audio optical media is typically formatted with a lead-in block containing various file system structures including a TOC listing the total number of audio tracks in the session. In an embodiment in which an entire source audio media is to be copied to a destination optical media, the source media TOC provides the total number of audio tracks, or songs, to be recorded. In another embodiment, some audio tracks from a single source are selected for recording to the destination optical media, and some audio tracks are not selected for recording. In such an embodiment, a total number of tracks to be recorded is obtained based on the selection of audio tracks for recording.

The method continues with operation 154 in which the maximum read speed of the source optical media device is obtained. Typically, the maximum read speed is encoded into the device firmware, and is further imported into and used by the host operating system. In one embodiment, the device read speed will be the maximum speed at which the device can read data from a source media mounted in the device. The maximum read speed is typically faster than the DAX speed for a media mounted in the device.

Figure 3A:
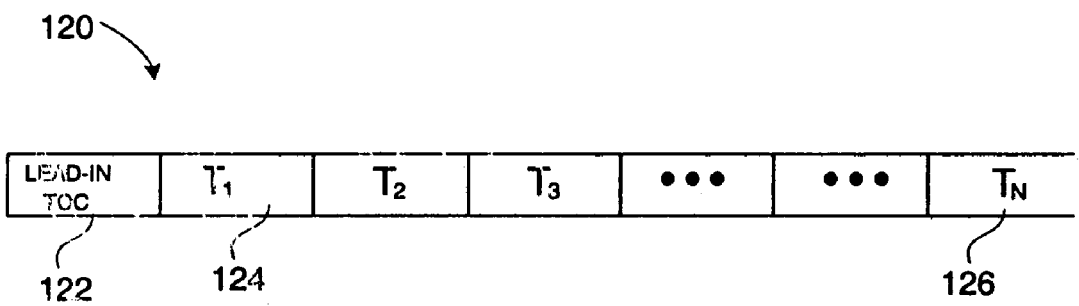
FIG. 3A shows an array created from a source media in accordance with one embodiment of the invention

Next, the method continues with operation 156 in which an array is created having a size corresponding to the number of audio tracks on the source optical media. FIG. 3A shows an array 120 created from a source media in accordance with one embodiment of the invention. The array 120 illustrated in FIG. 3A is represented as a block diagram showing each of the audio tracks from track $T_1$, 124, through track $T_N$, 126. Further, the lead-in track 122 is shown. As is known, a lead-out track is written if the session is closed. A lead-out block is not shown in FIG. 3A.

In another embodiment, a list is created having each track on the source media, and any other information related to each audio track as desired. In yet another embodiment, a file structure is created with similar information as described above for each of the audio tracks selected for recording.

The method proceeds to identify a mid-point of the array in operation 158. In one embodiment, the mid-point of the array is determined by dividing the total number of tracks by two, and then adding one. Therefore, if a total number of tracks is N, then the mid-point might be represented by N/2+1. In one embodiment, the audio track is used as a unit, and therefore the result must be a whole number. One embodiment of the invention rounds the result, if the result should be other than a whole number, up to the next whole number, and another embodiment rounds the result down to the previous whole number.

Figure 3B:
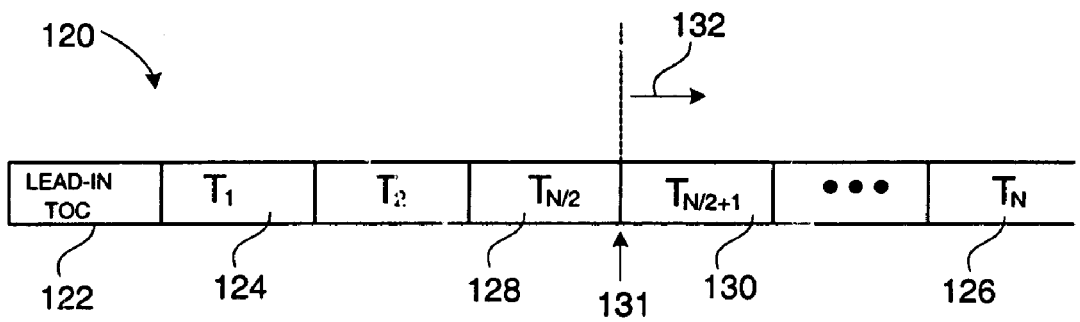
FIG. 3B shows the array of FIG. 3A in which the midpoint 1 has been identified in accordance with one embodiment of the invention.

FIG. 3B shows the array 120 of FIG. 3A in which the midpoint 131 has been identified in accordance with one embodiment of the invention. In FIG. 3B, the array 120 shows N audio tracks are on the source audio media identified as track $T_1$, 124 through track $T_N$, 126. The last track before the midpoint 131 in the array 120 is shown as track $T_{N/2}$ 128, and the first track after the midpoint 131 of the array 120 is shown as track $T_{N/2+1}$.

Returning to FIG. 2A, the method next proceeds with operation 160 in which the source optical media device read speed is set to the device maximum read speed. As described above, the device read speed is typically greater than a DAX speed for a given media. In one embodiment, in operation 162, the device is set to the maximum read speed so that succeeding operations can determine a maximum DAX speed for the most efficient utilization of resources.

The method continues with operation 162 in which a first audio track is read. As illustrated in FIG. 3A, the first audio track in one embodiment is track $T_1$, 124. Once the first audio track is read in operation 162, the method continues through connector "A" to the conclusion of flow chart diagram 150 in FIG. 2B.

FIG. 2B shows the conclusion of flowchart diagram 150 illustrating the method operations performed to measure a DAX speed in preparation for recording audio data to an optical media in accordance with one embodiment of the present invention. Proceeding though connector "A," the method next determines the DAX speed for the first audio track in operation 164. In one embodiment, the DAX speed is determined in accordance with a sub-routine or sub-algorithm of the method operations illustrated and described in flowchart diagram 150. The algorithm to perform the DAX speed determination, as called for in operation 164, is fully described in FIG. 4.

Figure 4:
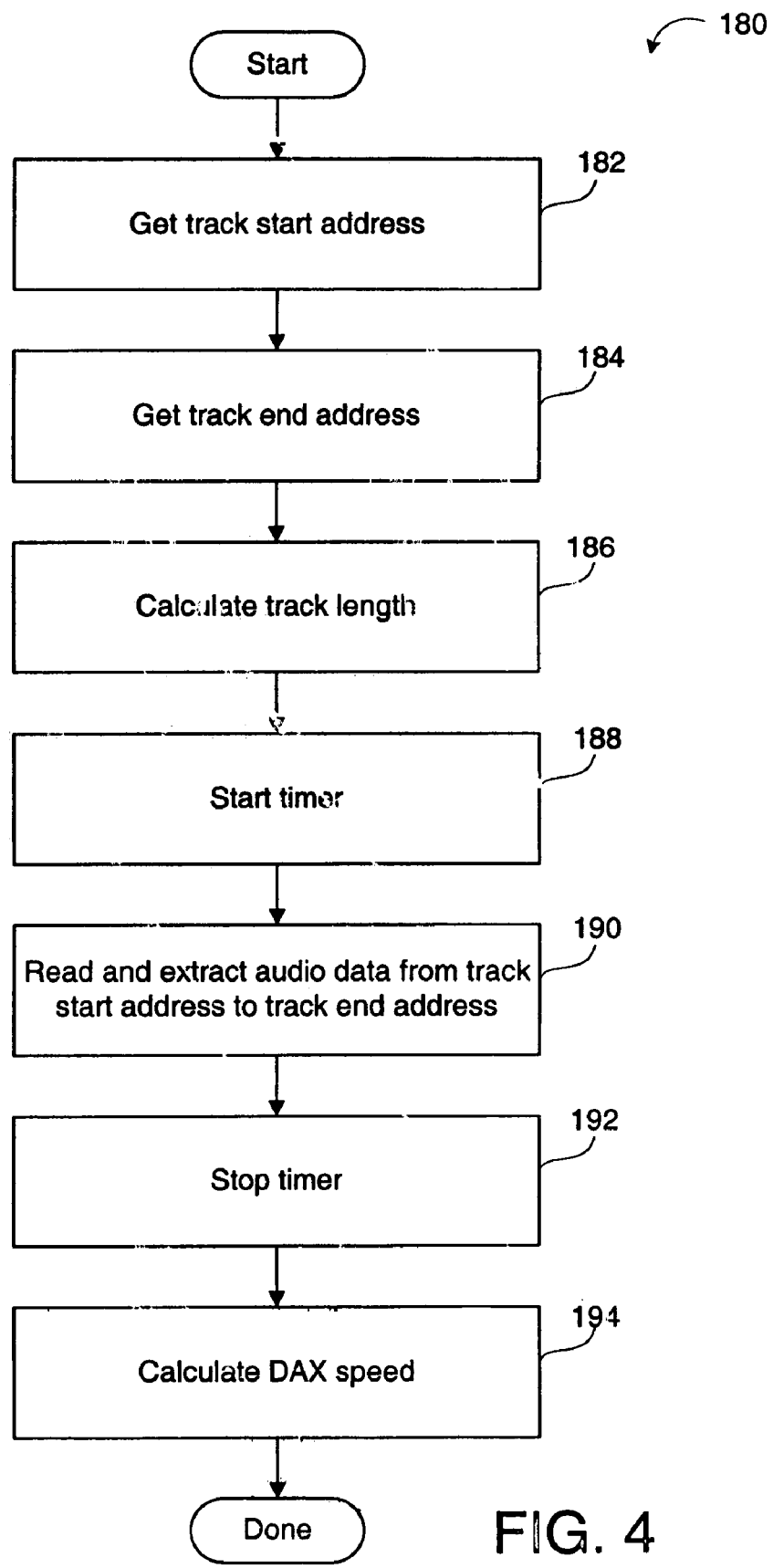
FIG. 4 shows a flow chart diagram of the method operations to determine a DAX speed for an audio track in accordance with one embodiment of the present invention.

FIG. 4 shows a flow chart diagram 180 of the method operations to determine a DAX speed for an audio track in accordance with one embodiment of the present invention. The method begins with operation 182 in which the start address of the track is obtained. In one embodiment, the track start address is the sector address of the first sector of the track. The method illustrated in FIG. 4 is applicable to determining a DAX speed for any audio track, at generally any source location, and therefore does not specify the exact sector or track number.

Next the method continues with operation 184 in which the track end address is obtained. In one embodiment, the track end address is the sector address of the last sector of the track.

A track length is calculated in operation 186. In one embodiment, the track length is calculated by subtracting the track start address from the track end address. Some file systems and formats provide a track length in a file system structure, file, directory, or other similar location for each track, and can be used in one embodiment of the present invention obviating operations 182 and 184. The illustrated embodiment is capable of being implemented in most operating system environments, and is compatible with a plurality of audio data formats.

Continuing with the method illustrated in FIG. 4, a timer is started in operation 188, and in operation 190 the audio data is extracted from the track start address through the track end address. Then in operation 192, the timer is stopped.

The method concludes with operation 194 in which the DAX speed is calculated. In one embodiment, the total track length is divided by the time to extract the audio data to provide the speed of digital audio extraction (DAX) for the measured audio track. With the calculation of the DAX speed, the method is done.

Returning to FIG. 2B, once the DAX speed for the first audio track is calculated in operation 164 as just described, the method advances to operation 166 in which the calculated DAX speed for the first track is saved as DAX1. In one embodiment, DAX1 is saved to the array 120 (see FIG. 3A, 3B) created in operation 156 of FIG. 2A. In an embodiment in which multiple sources or multiple source locations are used when recording, a source location, source address, and the like, is saved to the array in addition to the calculated DAX speed. In another embodiment, a list, file, structure or other similar tool is written or created to receive and save the DAX1 speed, source location or address if applicable, and any other track information as may be required and used in the process of writing the track to optical media.

The method continues with operation 168 in which the mid-point audio track is read. In one embodiment, the mid-point 131 (see FIG. 3B) as determined in operation 158 (see FIG. 2A) is at the beginning of an audio track to be recorded to optical media. As shown in FIG. 3B, the mid-point audio track is track $T_{N/2+1}$, 130. In operation 168, the mid-point track is read, similar to the reading of the first audio track in operation 162 (see FIG. 2A).

Next, in operation 170, the DAX speed for the mid-point audio track is determined. As described above in reference to operation 164, the determination of the DAX speed for any audio track, in one embodiment, is in accordance with the sub-routine illustrated and described in FIG. 4. Just as the DAX speed for the first audio track was calculated in operation 164, the DAX speed for the mid-point audio track is calculated in operation 170.

The method concludes with operation 172 in which the DAX speed for the mid-point audio track is saved as DAX2. In one embodiment, DAX2 is saved to the array 120 (see FIG. 3A, 3B) created in operation 156 of FIG. 2A. As described in reference to operation 166, if multiple source locations are used in recording, a source location, source address, and the like are also saved to the array. In another embodiment, a list, file, structure or other similar tool is written or created to receive and save DAX2, source location or source address if applicable, and any other track information as may be required and used in the process of writing the track to optical media. When DAX2 is saved, the method is done.

One embodiment of the present invention is simply an algorithm or method to determine DAX speeds for source audio tracks. The use of the calculated DAX speeds is determined by the optical media recording program, and the processes implemented in recording data to optical media. The embodiment of the present invention described in FIGS. 2A and 2B can be implemented as described in the following exemplary process.

Figure 1:
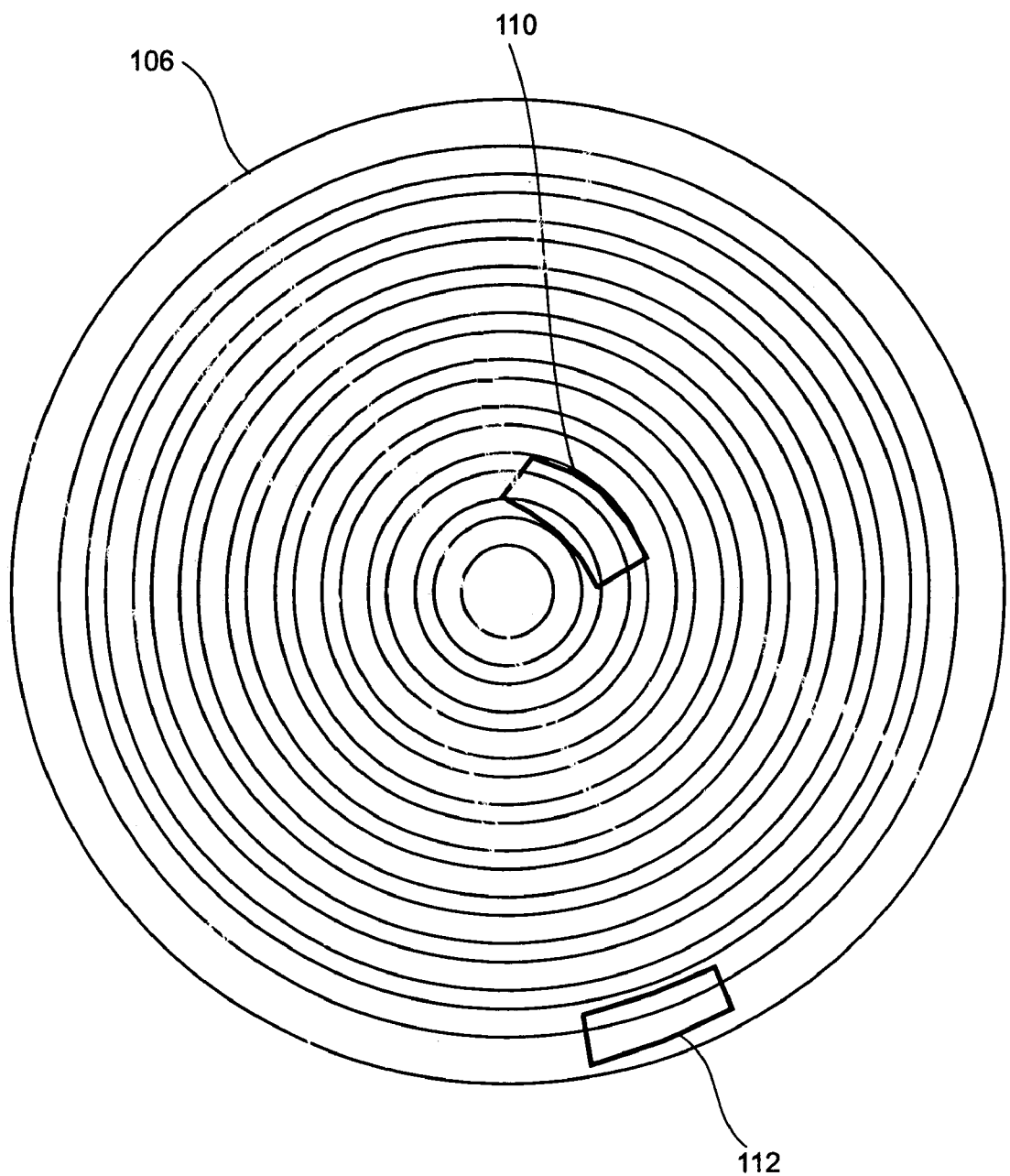
FIG. 1 shows a typical optical media.

As described above in reference to FIG. 1, the DAX speed for an optical media is not constant, for example, from a first track recorded to an interior region of an optical disc (see FIG. 1, 110) to a succeeding track recorded to an outer region of an optical disc (see FIG. 1, 112). The embodiment of the present invention described in FIGS. 2A and 2B accommodates the change in DAX speed as audio data is extracted from a source optical media by measuring the DAX speed at the first track and at the mid-point track. The recording speed to the destination optical media recording device is adjusted accordingly to more efficiently record to the destination optical media at a faster recording speed without increasing the risk of buffer underrun. The recording of audio tracks $T_1-T_{N/2}$ (see FIG. 3B) occurs at a first recording speed determined using DAX1, and the recording of tracks $T_{N/2+1}-T_N$ occurs at a second recording speed determined using DAX2. As described above, DAX2 is faster than DAX1, and therefore the recording speed determined using DAX2 is faster than the recording speed determined using DAX1. The resulting recording process is a more efficient use of available resources.

Figure 5A:
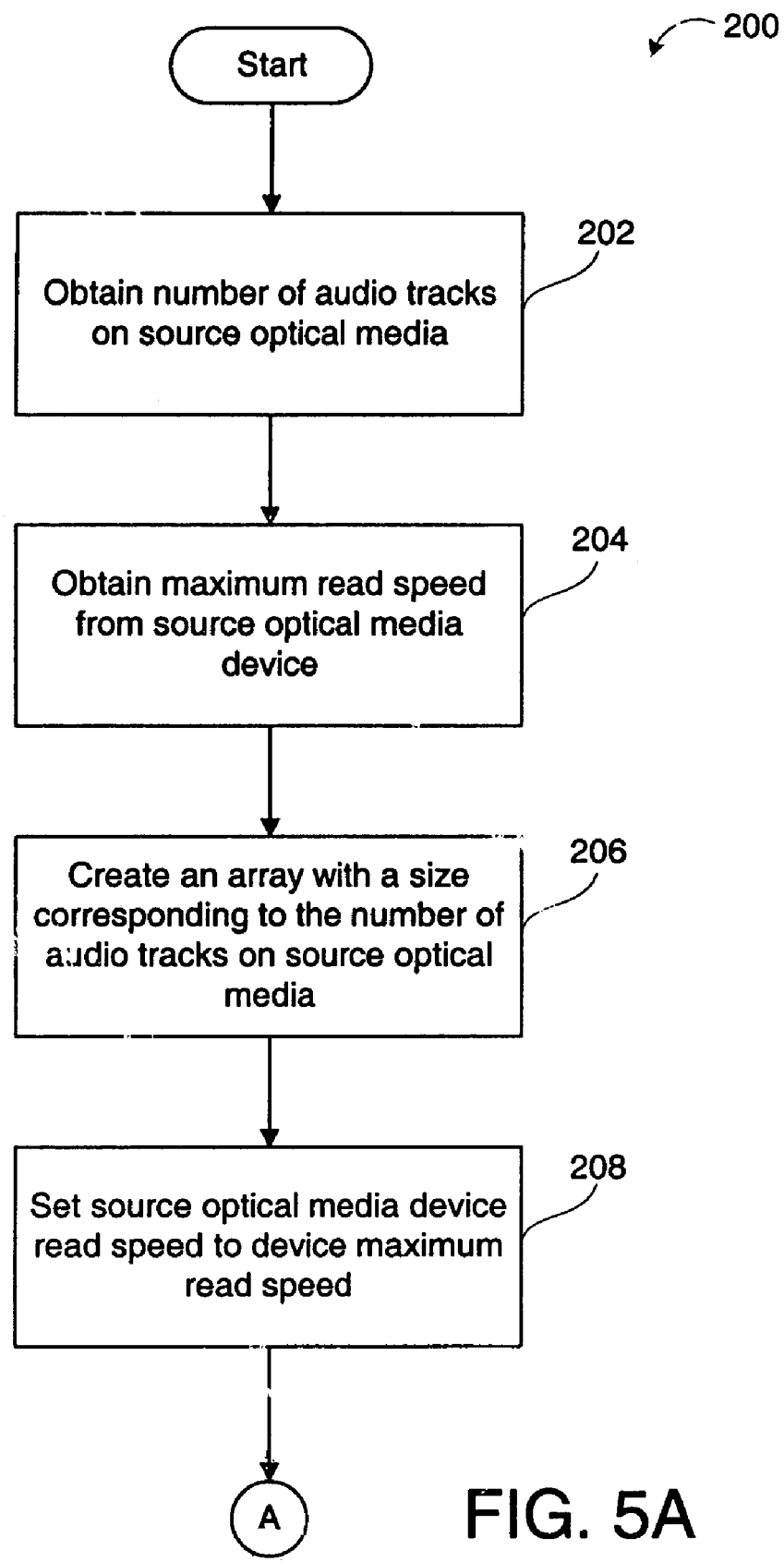
FIG. 5A shows a first part of a flowchart diagram illustrating the method operations performed to measure a DAX speed in preparation for recording audio data to an optical media in accordance with another embodiment of the present invention.
Figure 5B:
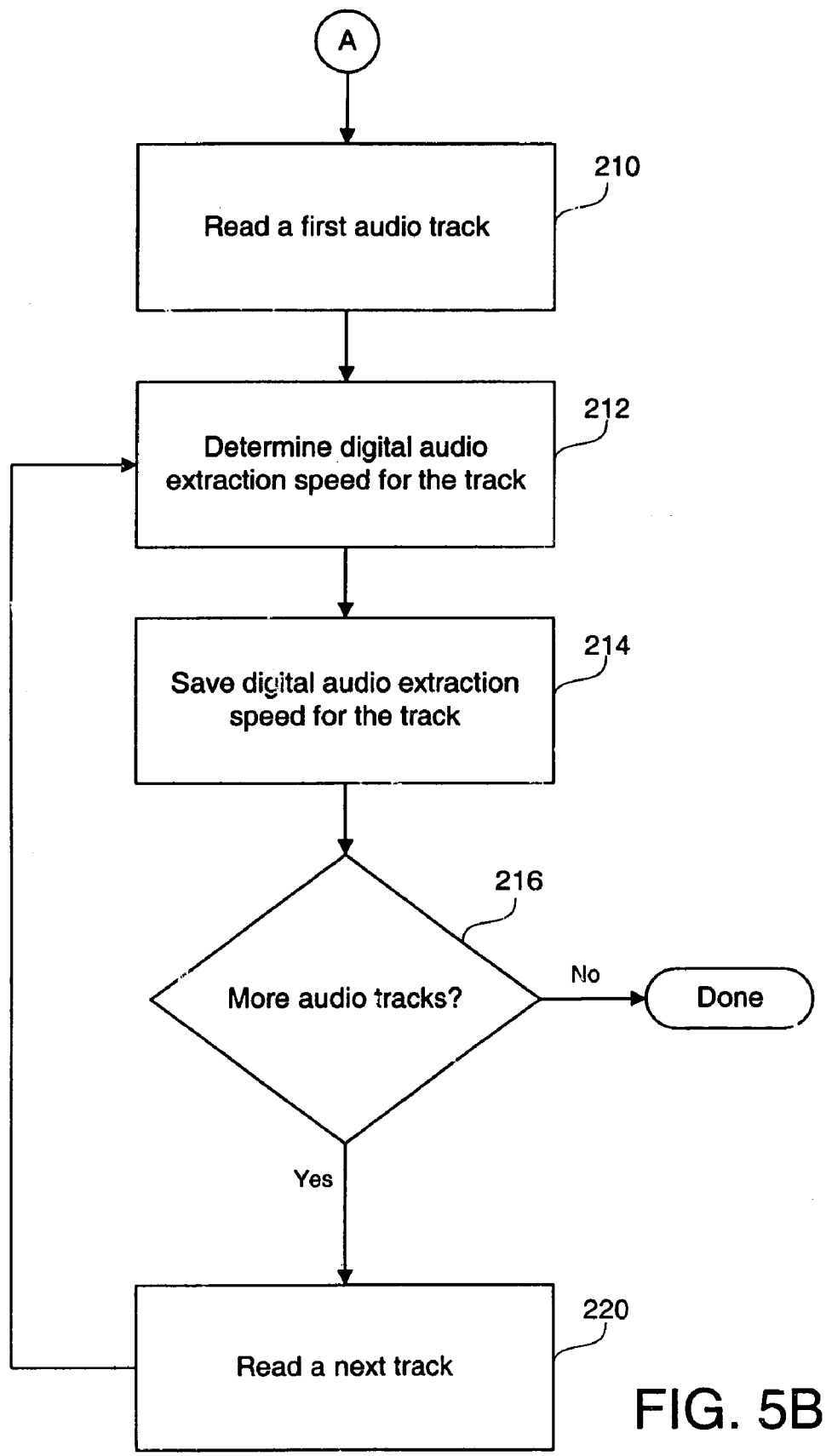
FIG. 5B shows a conclusion of a flowchart diagram illustrating the method operations performed to measure a DAX speed in preparation for recording audio data to an optical media in accordance with another embodiment of the present invention.

FIGS. 5A and 5B depict a flowchart diagram 200 illustrating the method operations performed to measure a DAX speed in preparation for recording audio data to an optical media in accordance with another embodiment of the present invention. FIG. 5A shows a first part of the flowchart diagram 200, and FIG. 5B shows the conclusion of flowchart diagram 200.

In FIG. 5A, the method begins with operation 202 in which the number of audio tracks on a source optical media is obtained. In one embodiment, the present invention is implemented to duplicate an existing optical media. By way of example, a consumer may desire to create a back-up copy of a favorite audio CD. In another example, a consumer may wish to record a duplicate of an entire audio CD in another format. In accordance with an embodiment of the present invention, the number of audio tracks on the source optical media are obtained in operation 202. In another embodiment, the number of source audio tracks selected for recording is obtained.

The number of tracks on the source optical media is obtained as described above in reference to operation 152 of FIG. 2A. Generally, in one embodiment of the invention, a table of contents (TOC) 122 (see FIGS. 3A, 3B) of the source media is read to obtain the total number of audio tracks to be read from a source media and recorded to a destination optical media. As described above, the TOC is typically read from the lead-in block(s) of the source optical media. In an embodiment in which an entire source audio media is to be copied to a destination optical media, the source media TOC provides the total number of audio tracks, or songs, to be recorded. In another embodiment, some audio tracks from a single source are selected for recording to the destination optical media, and some audio tracks are not selected for recording. In such an embodiment, a total number of tracks to be recorded is obtained based on the selection of audio tracks for recording. Additionally, in one embodiment, source locations are also obtained if more than one location is selected.

The method continues with operation 204 in which the maximum read speed of the source optical media device is obtained. As described above in reference to FIG. 2A, the maximum read speed is typically coded into the device firmware, and is usually imported into for use by the host computer operating system. In one embodiment, the device read speed will be the maximum speed at which the device can read data from a source media mounted in the device. The maximum read speed is typically faster than the DAX speed for a media mounted in the device.

The method proceeds with operation 206 in which an array with a size corresponding to the number of audio tracks on the source optical media is created. FIG. 3A shows an array 120 created from a source media in accordance with one embodiment of the invention. The array 120 illustrated in FIG. 3A is represented as a block diagram showing each of the audio tracks from track $T_1$, 124, through track $T_N$, 126. Further, the lead-in track 122 is shown. As is known, a lead-out track is written if the session is closed. A lead-out block is not shown in FIG. 3A.

In another embodiment, a list is created having each track on the source media, and any other information related to each audio track as desired. In one embodiment, other information may include a source location or source address, if multiple sources are selected from which audio tracks are to be recorded. In yet another embodiment, a file structure is created with similar information as described above for each of the audio tracks selected for recording.

Next, the method continues with operation 208 in which the source optical media device read speed is set to the device maximum read speed. As described above, the DAX speed is typically slower than a device maximum read speed. In one embodiment, the maximum achievable DAX speed is achieved when the device read speed is set to the device maximum read speed. Once the maximum read speed is set, the method continues through connector "A" to the conclusion of flow chart diagram 200 in FIG. 5B.

FIG. 5B shows a conclusion of flowchart diagram 200 illustrating the method operations performed to measure a DAX speed in preparation for recording audio data to an optical media in accordance with another embodiment of the present invention. The method continues with operation 210 in which a first audio track is read. Similar to operation 162 described in FIG. 2A above, and as illustrated in FIG. 3A, the first audio track in one embodiment is track $T_1$, 124.

Next, the method continues with operation 212 in which the DAX speed for the first audio track is determined. Described above in reference to FIG. 2B, and illustrated in FIG. 4, the DAX speed is determined in one embodiment as already described, and then the DAX speed determined in operation 212 is saved in operation 214. In one embodiment, the DAX speed is saved to the array created in operation 206 of FIG. 5A. In one embodiment, the calculated DAX speed is saved with a source location or source address when multiple source locations are selected. In other embodiments, a file, file structure, or other similar structure is created, and the file structure is created for receiving the DAX speed(s) as determined in operation 212, a source location or source address if applicable, and any other information as desired, for use in recording the corresponding audio track to a destination optical media.

The method advances to decision block 216 when it is determined whether there are more audio tracks selected for recording to an optical media. In the embodiment of the invention illustrated in FIGS. 5A and 5B, the DAX speed for each audio track selected for recording is measured. Decision block 216 sets up a loop to ensure each audio track selected for recording is read. If there are more tracks to be read, a "yes" to decision block 216, the method advances to operation 220 in which a next audio track is read.

The next audio track is read in operation 220 just as the first audio track is read in operation 210. Once the next audio track is read, the method loops back to operation 212 to determine the DAX speed, and then to operation 214 to save the determined DAX speed.

The loop repeats for as many audio tracks as there are selected for recording. In one embodiment, the number of audio tracks selected is equal to the number of audio tracks on the source optical media. In another embodiment, the number of audio tracks selected is less than the number of audio tracks on the source optical media, and in yet another embodiment, the number of audio tracks selected for recording is greater than then number of audio tracks on a single source. The DAX speed is determined only for those audio tracks selected. In yet another embodiment, the selected audio tracks are in a plurality of locations or on a plurality of source optical media. In this embodiment, the DAX speed is determined for each audio track selected for recording, and saved to the array, list, file, file structure, or whichever method is implemented for saving the determined DAX speed along with the source location, source address, and other source audio track information as may be desired or required by a particular recording application to record the selected tracks to the destination optical media.

When there are no more audio tracks selected for recording, a "No" to decision block 216, the method is done.

FIGS. 6A through 6F depict a flowchart diagram 250 illustrating the method operations performed to measure a DAX speed in preparation for recording audio data to an optical media in accordance with another embodiment of the present invention. Flowchart diagram 250 begins in FIG. 6A, and continues through each of FIGS. 6B through 6F.

Figure 6A:
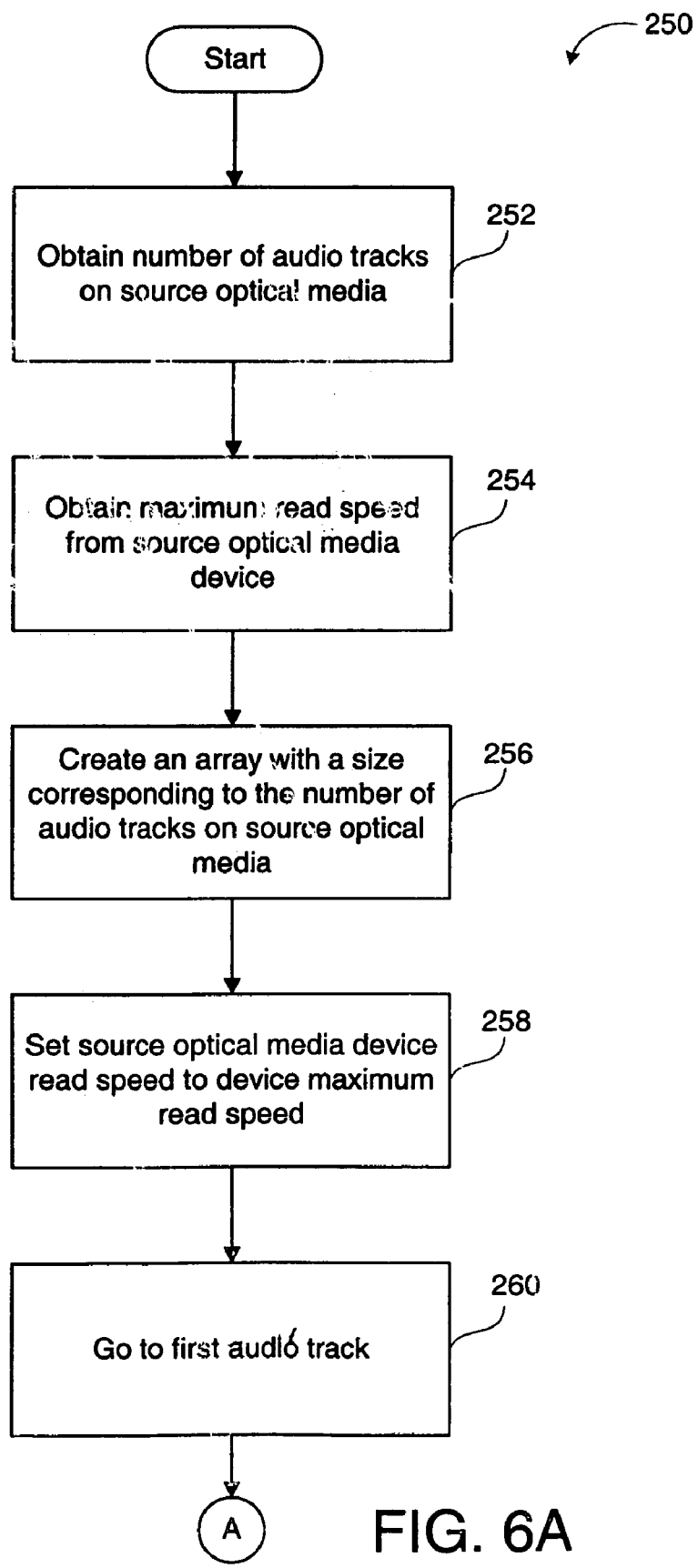
FIG. 6A shows a first part of a flowchart diagram illustrating the method operations performed to measure a DAX speed in preparation for recording audio data to an optical media in accordance with another embodiment of the present invention.

As shown in FIG. 6A, the method begins in a similar manner as those methods illustrated and described in FIGS. 2A and 5A. The method begins with operation 252 in which the number of audio tracks on the source optical media is obtained, and then the method continues with the obtaining of the maximum read speed of the source optical media device in operation 254. An array is created having a size corresponding to the number of audio tracks on the source optical media in operation 256, and the source optical media device read speed is set to the device maximum read speed in operation 258. Each of the method operations described in operations 252, 254, 256, and 258 have been fully described above in reference to FIGS. 2A and 5A.

Next, the method continues with operation 260 in which the read head is set to the first audio track. In one embodiment, a "go to" command is directed to position a read head that will read audio, or other, data from a source. Once positioned at the first audio track at a source, the method proceeds through connector "A" to FIG. 6B.

Figure 6B:
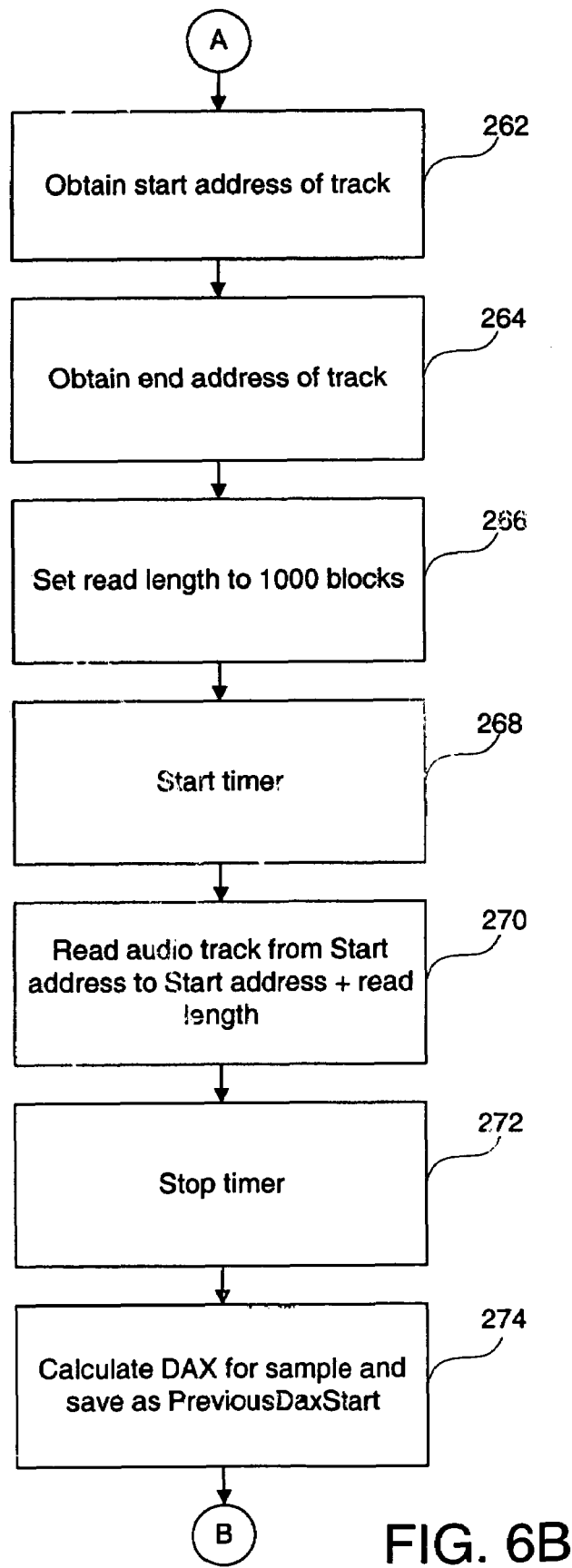
FIG. 6B shows another part of a flowchart diagram illustrating the method operations performed to measure a DAX speed in preparation for recording audio data to an optical media in accordance with another embodiment of the present invention.

FIG. 6B shows a continuation of flowchart diagram 250 illustrating the method operations performed to measure a DAX speed in preparation for recording audio data to an optical media in accordance with another embodiment of the present invention. Proceeding through connector "A," the method continues with operation 262 in which the start address of the first audio track is obtained. In one embodiment, as described above in reference to FIG. 4, the track start address is the sector address of the first sector of the track. In another embodiment, the sector number for the start address of the track is obtained from the TOC of the optical media in the source drive. In the following method operations, a portion of selected audio tracks is measured to determine DAX speeds, and therefore the track start address (operation 262) and the track end address (operation 264) are obtained as reference points to the audio track.

The method continues with operation 264 in which the end address of the audio track is obtained which, in one embodiment, is the sector address of the last sector of the track.

In the illustrated embodiment, the method continues with operation 266 in which a read length is set to 1000 blocks. In other embodiments, the read length is set to more or less than 1000 blocks according to system configuration and recording preferences. The read length is a selected number of blocks that are read to determine a DAX speed for selected portions of an audio track. In one embodiment, the read length is established as a set number of blocks used for DAX speed sampling at a plurality of locations on the source media. Use of the read length is illustrated in the following method operations.

Next, in operation 268, a timer is started, and then in operation 270, the audio track is read from the start address to the start address plus 1000 blocks. In operation 272, the timer is stopped. Method operations 268, 270, and 272 therefore read a first portion of the first audio track. In the illustrated embodiment, the first portion is equal to the first 1000 blocks of the audio track.

The method continues with operation 274 is which the DAX speed for the first 1000 blocks of the first audio track is calculated. As described above in reference to FIG. 4, this calculation of DAX speed is simply the number of sectors of audio data extracted in the measured time period, producing a rate of digital audio extraction. Once the DAX speed is calculated in operation 274, it is saved as PreviousDaxStart. As described above in reference to FIGS. 2B and 5B, the calculated DAX speed is saved in one embodiment to the array created in operation 256 in the block for Track 1. In one embodiment, PreviousDaxStart is saved to a temporary file or file structure to be used during the method operations of DAX speed calculation which is deleted or discarded at the completion of the recording process. In other embodiments, the calculated DAX speed is saved to a list, file, file structure, or other similar structure or method for saving file information. Once the PreviousDaxStart value is saved in operation 274, the method proceeds through connector "B." to FIG. 6C.

Figure 6C:
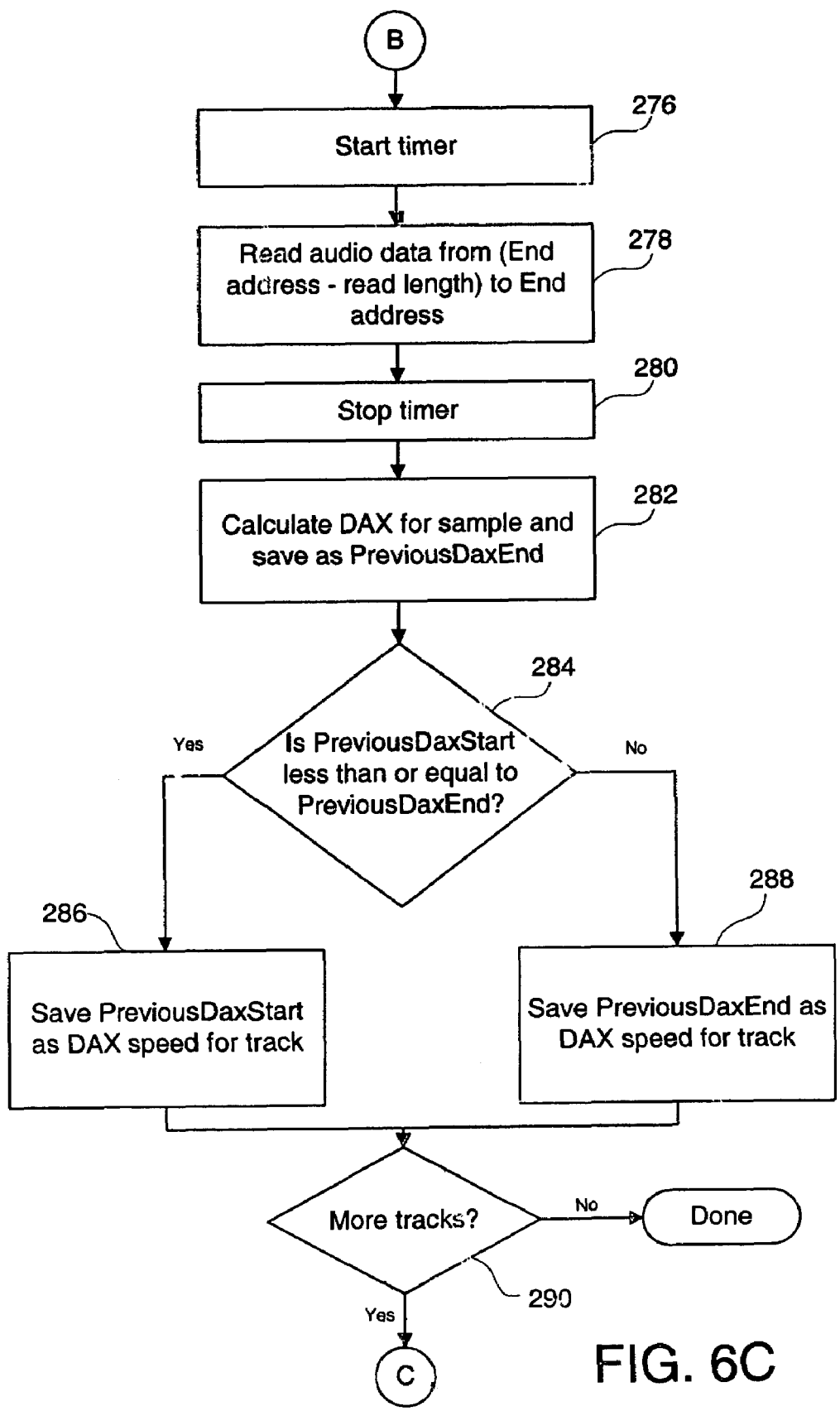
FIG. 6C shows another part of a flowchart diagram illustrating the method operations performed to measure a DAX speed in preparation for recording audio data to an optical media in accordance with another embodiment of the present invention.

FIG. 6C shows the continuation of flowchart diagram 250 illustrating the method operations performed to measure a DAX speed in preparation for recording audio data to an optical media in accordance with another embodiment of the present invention. Proceeding through connector "B," the method continues with operation 276 in which a timer is once again started. In one embodiment, operations 276, 278, 280, and 282 are accomplished in order to calculate another DAX speed for another sampling of the source optical media. Therefore, in operation 276, it should be appreciated that the timer has been re-set to zero or some other base line calibration prior to starting the timer in operation 276.

Next, in operation 278, another read length (1000 blocks) is read. The last 1000 blocks of the current audio track, which in this example is the first audio track, is read and audio data extracted. In operation 278, the 1000 blocks to be read are established by subtracting the read length (1000 blocks) from the track end address, and extracting the audio data from that calculated point through the track end address. Then, in operation 282, the timer is stopped.

The method continues with operation 282 in which the DAX speed is calculated for the sample. The DAX speed is calculated, in one embodiment, as described above in FIG. 4, by dividing the number of blocks read by the measured amount of time to extract the audio data. Once the DAX speed is calculated for the sample, the DAX speed is saved as PreviousDaxEnd. In one embodiment, PreviousDaxEnd is saved to a temporary file or file structure to be used during the method operations of DAX speed calculation which is deleted or discarded at the completion of the recording process. The temporary file or file structure may or may not be the same temporary file or file structure used to save PreviousDaxStart. As will be obvious in further description of the method, "End" refers to a sampling DAX speed calculation at the end of an audio track.

The method proceeds with decision block 284 in which it is determined whether the PreviousDaxStart calculated and saved in operation 274 is less than or equal to Previous- DaxEnd calculated and saved in operation 282. As described above, generally, the DAX speed increases with increasing distance from the center of an optical disc. Therefore, the DAX speed in a first track will typically be slower than a DAX speed in a subsequent track. Similarly, it is expected that the DAX speed at the beginning of an audio track as measured in the first 1000 blocks will be slower, or equal to the DAX speed at the end of an audio track as measured in the last 1000 blocks of the audio track, depending on the length of the audio track. In the event that the DAX speed at the beginning of the sampled audio track is not less than or equal to the DAX speed at the end of the sampled audio track, decision block 284 ensures the slowest DAX speed will be used in the determination of the record speed for the particular audio track in order to minimize risk of buffer underrun.

If the PreviousDaxStart as calculated and saved in operation 274 is less than or equal to PreviousDaxEnd as calculated and saved in operation 282, a "yes" to decision block 284, the method proceeds to operation 286 in which the PreviousDaxEnd is saved as the DAX speed for the audio track. If, conversely, the PreviousDaxStart is not less than or equal to PreviousDaxEnd, a "no" to decision block 284, the method proceeds to operation 288 in which the Previous-DaxEnd is saved as the DAX speed for the audio track. In this manner, the slower of the two calculated DAX speeds for the audio track is selected as the DAX speed for the entire audio track, thereby minimizing the risk of buffer underrun when recording. In one embodiment, when a DAX speed is selected and saved for the audio track, a source location or source address is saved with the selected DAX speed if multiple source locations are used.

The method next advances to decision block 290 in which it is determined whether there are more audio tracks selected for recording to optical media. Decision block 290 sets up a loop, as will be described in greater detail below, to ensure each audio track selected for recording to a destination optical media is sampled and a DAX speed determined for the audio track. If there are no more audio tracks selected for recording, a "no" to decision block 290, there are no more DAX calculations to be made and the method is done. If there are additional audio tracks, a "yes" to decision block 290, the method proceeds through connector "C" to a continuation of flow chart diagram 250 as shown in FIG. 6D.

Figure 6D:
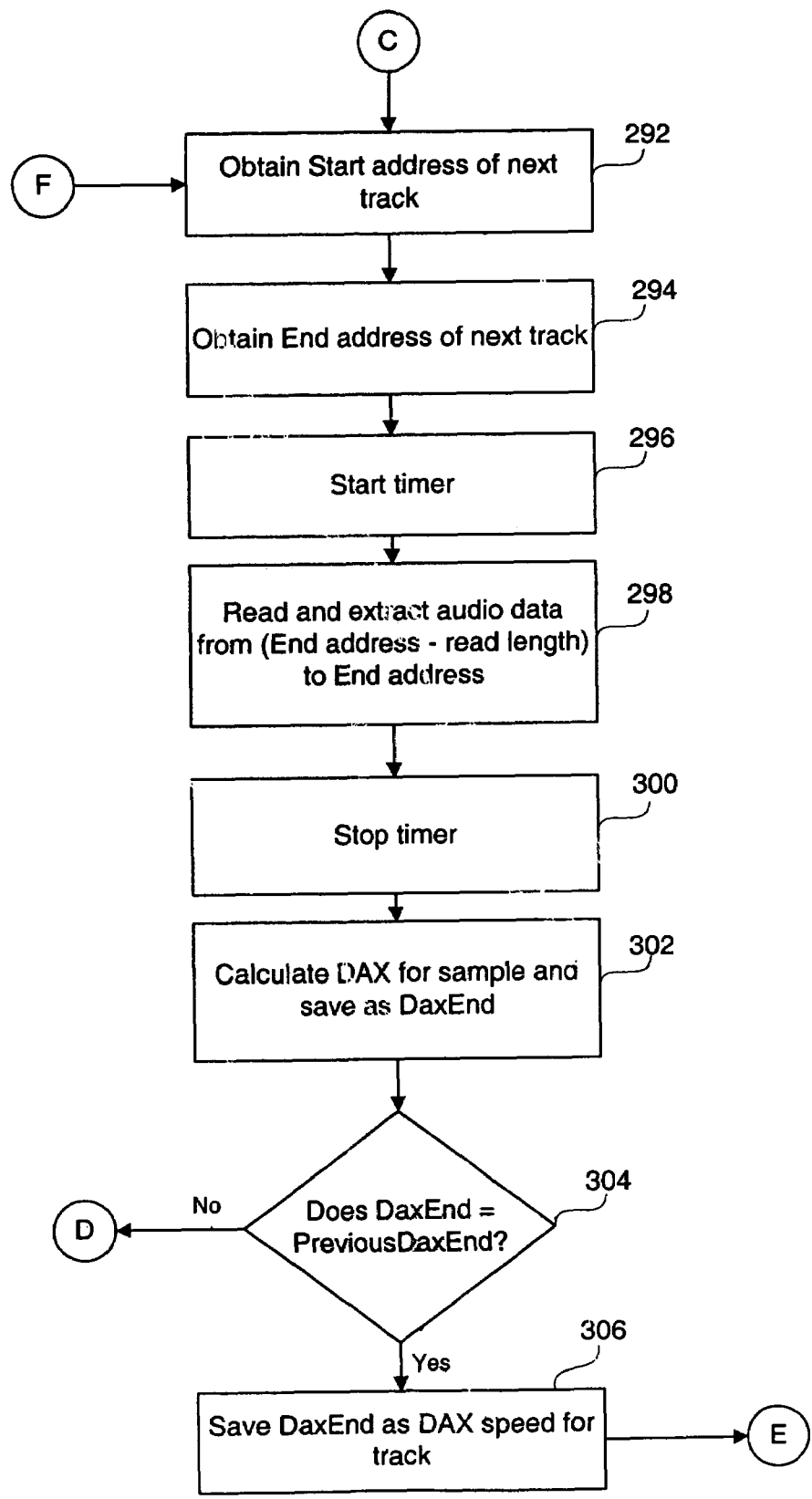
FIG. 6D shows another part of a flowchart diagram illustrating the method operations performed to measure a DAX speed in preparation for recording audio data to an optical media in accordance with another embodiment of the present invention.

FIG. 6D shows the continuation of flowchart diagram 250 illustrating the method operations performed to measure a DAX speed in preparation for recording audio data to an optical media in accordance with another embodiment of the present invention. The method proceeds through connector "C" with operation 292 in which a start address of a next track is obtained. The start address is obtained in any of a plurality of manners including the reading of a TOC, the reading of a sector number at the start of the audio track, and the like as described above in reference to operation 262 in FIG. 6B. An end address is obtained in a similar manner in operation 294.

The method proceeds with operation 296 in which a timer is started, and then in operation 298, the audio data from the last 1000 blocks of the next track is extracted. Just as was done in operation 278 described above, the last 1000 blocks are identified for sampling by subtracting the read length (1000 blocks as established in operation 266) from the end address obtained in operation 294.

In one embodiment, the method includes the sampling of the last 1000 blocks, or whatever the read length may be, at this point in order to determine whether the first 1000 blocks, or whatever the read length may be, need be sampled. The first 1000 blocks of the current audio track will be in close proximity to the last 1000 blocks of the previous audio track, and it is at least probable that the DAX speed will remain essentially the same as that DAX speed calculated in operation 282. In an embodiment of the present invention, the last 1000 blocks, or whatever the read length may be, is first sampled, and, as described below, only if the DAX speed changes will the first 1000 blocks be sampled.

As the method proceeds, the timer is stopped in operation 300, and the DAX speed for the sample is calculated in operation 302 in the same manner as previously described (see FIG. 4). The DAX speed calculated in operation 302 is saved as DaxEnd.

Next, in decision block 304, it is determined whether DaxEnd calculated in operation 302 equals PreviousDaxEnd calculated in operation 282. If DaxEnd equals PreviousDaxEnd, a "yes" to decision block 304, the method proceeds to operation 306 in which DaxEnd is saved as the DAX speed for the audio track. The method then proceeds through connector "E" to a continuation of flow chart 250 shown in FIG. 6E.

Figure 6E:
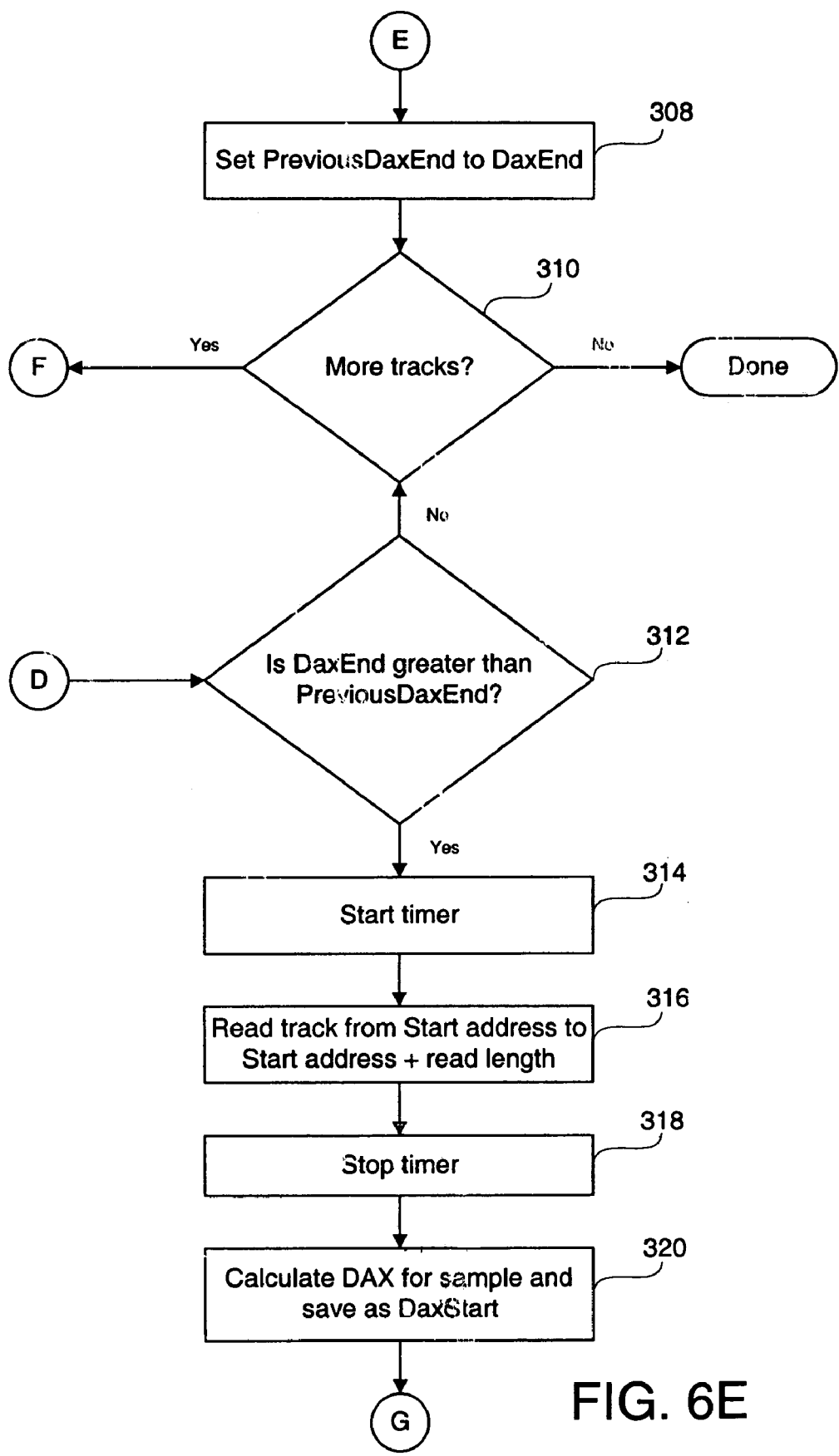
FIG. 6E shows another part of a flowchart diagram illustrating the method operations performed to measure a DAX speed in preparation for recording audio data to an optical media in accordance with another embodiment of the present invention.

FIG. 6E shows the continuation of flowchart diagram 250 illustrating the method operations performed to measure a DAX speed in preparation for recording audio data to an optical media in accordance with another embodiment of the present invention. Proceeding through connector "E," the method continues with operation 308 in which Previous-DaxEnd is set to DaxEnd as calculated and saved in operation 302. In this manner, PreviousDaxEnd is maintained at the DAX speed as calculated for the most recently evaluated sample. In operation 308, PreviousDaxEnd and DaxEnd are equivalent DAX speeds, and in one embodiment, the method includes the redundant operation to carry the DAX speed forward in continuing sampling of audio tracks. The method then continues with decision block 310 to determine whether more audio tracks remain to be evaluated. If no more tracks remain, a "no" to decision block 310, the method is done. If more audio tracks remain to be sampled, a "yes" to decision block 310, the method proceeds through connector "F" to loop back to operation 292 in FIG. 6D. The method then repeats operations 292, 294, 296, 298, 300, and 302 as illustrated and previously described in FIG. 6D for the next audio track.

Returning to decision block 304 in FIG. 6D, if DaxEnd as calculated and saved in operation 302 does not equal the PreviousDaxEnd, a "no" to decision block 304, the method proceeds through connector D to the continuation of flow chart 250 shown in FIG. 6E.

Turning again to FIG. 6E, and proceeding through connector "D," the method continues with decision block 312 in which it is determined whether DaxEnd is greater than PreviousDaxEnd. If DaxEnd is not greater than Previous-DaxEnd, the only remaining state is that DaxEnd is less than PreviousDaxEnd. In one embodiment, this is an unlikely result as the DAX speed generally increases with successive tracks away from the center of an optical disc. If, however, the DAX speed should decrease, one embodiment of the invention makes no changes to the previously saved PreviousDaxEnd, and proceeds to decision block 312 to determine whether more audio tracks remain to be sampled. If no more tracks remain, a "no" to decision block 310, the method is done. If more audio tracks remain, a "yes" to decision block 310, the method proceeds through connector "F" to operation 292 in FIG. 6D as already described.

Returning to decision block 312, if DaxEnd as calculated and saved in operation 302 is greater than PreviousDaxEnd, a "yes" to decision block 312, the method proceeds to operation 314 in which the timer is once again started. As described above in reference to operation 296, the timer would have been reset to zero or some other base line calibration point prior to use for a next DAX calculation.

The method continues with operation 316 in which the first 1000 blocks, the current read length, of the audio track are read and audio data extracted. The timer is stopped in operation 318, and the DAX speed is calculated in operation 320 as described above in reference to FIG. 4. The calculated DAX for the first 1000 blocks is saved as DaxStart.

In one embodiment, operations 314, 316, 318, and 320 are performed because the sampling of the DAX speed at the end of the audio track showed an increase in DAX speed between the last 1000 blocks of the previous audio track and the last 1000 blocks of the current audio track. Therefore, in order to determine a best DAX speed to set for pre-record calculations, the DAX speed for the first 1000 blocks (or whatever the read length may be) is calculated, and a DAX speed set as described below.

Figure 6F:
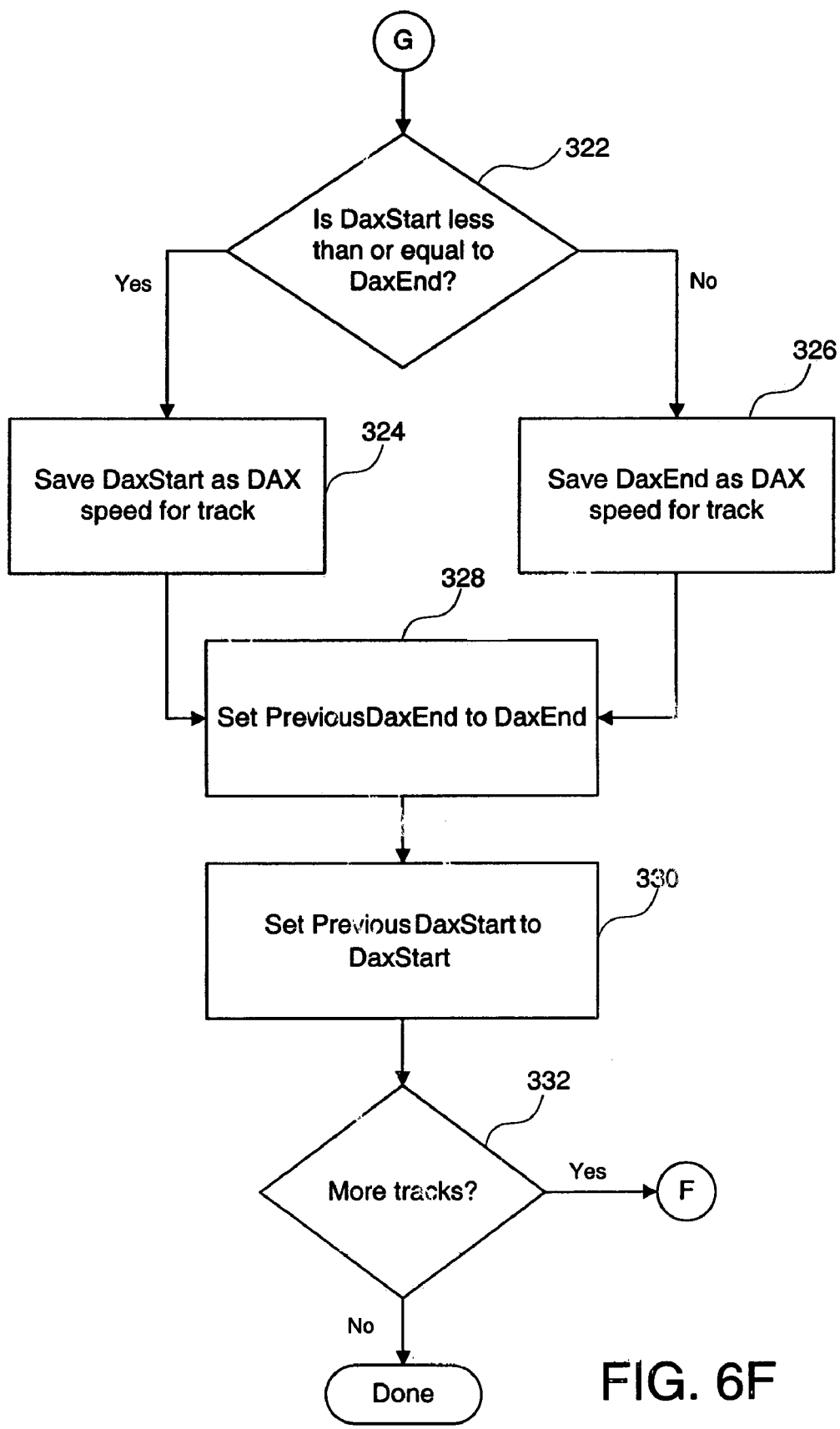
FIG. 6F shows a conclusion of a flowchart diagram illustrating the method operations performed to measure a DAX speed in preparation for recording audio data to an optical media in accordance with another embodiment of the present invention.

Following operation 320, the method proceeds through connector "G" to the conclusion of flow chart diagram 250 shown in FIG. 6F. Turning to FIG. 6F, the method proceeds through connector "G" to decision block 322 in which it is determined whether DaxStart as calculated and saved in operation 320 is less than or equal to DaxEnd as calculated and saved in operation 302. If DaxStart is less than or equal to DaxEnd, a "yes" to decision block 322, the method proceeds to operation 324 in which DaxStart is saved as the DAX speed for the audio track. If DaxStart is not less than or equal to DaxEnd, a "no" to decision block 322, the method proceeds with operation 326 in which DaxEnd is saved as the DAX speed for the audio track.

In one embodiment of the invention, decision block 322 and operations 324 and 326 evaluate the sampled blocks from the beginning and from the end of an audio track and selects the slower of the two DAX speeds to save as the DAX speed for the audio track to be used for pre-record calculations. This minimizes the risk of buffer underrun while using actual sampled DAX for the most efficient use of recording resources.

The method continues with operation 328 in which PreviousDaxEnd is set to the value of DaxEnd, and then in operation 330, PreviousDaxStart is set to the value of DaxStart. Operations 328 and 330 maintain the currency of the values of the calculated DAX samplings for the beginning and end of the audio track to ensure subsequent audio tracks compare sampled DAX speeds to the audio track immediately preceding the sampled track.

The method continues with decision block 332 in which it is determined if there are more audio tracks for which DAX speeds are to be calculated. If there are more audio tracks, a "yes" to decision block 332, the method loops back through connector "F" to operation 292 shown in FIG. 6D, and proceeds as already described. If no more audio tracks remain to be evaluated, a "no" to decision block 332, the method is done.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include hard drives, network attached storage (NAS), read-only memory, random-access memory, CD media, DVD media, magnetic tapes, and other optical and non-optical data storage devices. The computer readable medium can also be distributed over network coupled computer systems so that the computer readable code is stored and executed in a distributed fashion.

Furthermore the present invention is illustrated as implemented in one of a plurality of programming languages. Other programming languages may be used to implement the embodiments of the present invention (e.g., C, C++, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining a record speed for recording audio data from a source optical media to a destination optical media, comprising:

determining a maximum read speed for a source optical media device;

setting the source optical media device to the maximum read speed;

reading a first part of a first audio track on the source optical media;

determining a digital audio extraction (DAX) speed for the first part of the first audio track;

reading an end part of the first audio track on the source optical media;

determining a DAX speed for the end part of the first audio track;

selecting the slower of the DAX speed for the first part of the first audio track and the DAX speed for the end part of the first audio track;

reading an end part of a next audio track on the source optical media;

determining a DAX speed for the end part of the next audio track;

comparing the DAX speed for the end part of the next audio track with the DAX speed for the end part of the first audio track;

selecting the DAX speed for the end part of the next audio track when the DAX speed for the end part of the next audio track is less than or equal to the DAX speed for the end part of the first audio track;

repeating the reading of the end part of the next audio track, the determining of the DAX speed for the end part of the next audio track, and the comparing of the DAX speed for the end part of the next audio track with the DAX speed of an end part of an immediately preceding audio track for each audio track on the source optical media;

repeating the selecting of the DAX speed for the end part of the next audio track when the DAX speed for the end part of the next audio track is less than or equal to the DAX speed for the end part of the immediately preceding audio track for each audio track on the source optical media; and determining a recording speed for the audio tracks to the destination optical media using the selected DAX speeds.

2. The method of claim 1, wherein when the DAX speed for the end part of the next audio track is not less than or equal to the DAX speed for the end part of the immediately preceding audio track, the method further comprises:

reading a first part of the next audio track;

determining a DAX speed for the first part of the next audio track; and selecting the slower of the DAX speed of the first part of the next audio track and the DAX speed for the end part of the next audio track.

3. The method of claim 2, further comprising:

creating an array with a size corresponding to the number of audio tracks on the source optical media to be recorded to the destination optical media; and saving the selected DAX speed for each audio track on the source optical media to a corresponding position on the array.

4. The method of claim 2, further comprising saving the selected DAX speed for each audio track on the source optical media to a temporary file structure.

5. The method of claim 2, wherein the destination optical media is a compact disc.

6. The method of claim 2, wherein the method is implemented in a computer readable media having program instructions implementing the method for determining the record speed for recording audio data from a source optical media to a destination optical media.

* * * * *